(12) United States Patent
Biswas et al.

(10) Patent No.: US 8,865,833 B2
(45) Date of Patent: Oct. 21, 2014

(54) POLYCARBONATE COMPOSITION COMPRISING NANOMATERIALS

(75) Inventors: Amit Biswas, Navi Mumbai (IN); Dibakar Dhara, Bangalore (IN); Raja Krishnamurthy, Bangalore (IN); Edward Kung, West Chester, PA (US); Parnasree Maiti, Bangalore (IN); Roopali Rai, Bangalore (IN); Vaidyanath Ramakrishnan, Bangalore (IN); Vitthal Abaso Sawant, Maharashtra (IN); Rajashekhar Shiddappa Totad, Bangalore (IN); Sandeep Tyagi, Maharashtra (IN)

(73) Assignee: Sabic Global Technologies B.V. (NL)

( * ) Notice: Subject to any disclaimer, the term of this patent is extended or adjusted under 35 U.S.C. 154(b) by 159 days.

(21) Appl. No.: 12/836,036

(22) Filed: Jul. 14, 2010

(65) Prior Publication Data

US 2010/0280176 A1 Nov. 4, 2010

Related U.S. Application Data

(63) Continuation of application No. 11/846,945, filed on Aug. 29, 2007, now abandoned, which is a continuation-in-part of application No. 11/536,867, filed on Sep. 29, 2006, now abandoned.

(51) Int. Cl.
| | |
|---|---|
| *C08K 3/36* | (2006.01) |
| *B82Y 30/00* | (2011.01) |
| *C08J 5/00* | (2006.01) |
| *C08L 69/00* | (2006.01) |
| *C08G 64/30* | (2006.01) |

(52) U.S. Cl.
CPC ............ *C08K 3/36* (2013.01); *C08K 2201/003* (2013.01); *B82Y 30/00* (2013.01); *C08G 64/307* (2013.01); *C08J 5/005* (2013.01); *C08J 2369/00* (2013.01); *C08L 69/00* (2013.01)
USPC ............ 524/847; 524/841; 524/845; 524/876

(58) Field of Classification Search
USPC .................................. 524/841, 845, 847, 876
See application file for complete search history.

(56) References Cited

U.S. PATENT DOCUMENTS

| | | | |
|---|---|---|---|
| 6,239,195 | B1 | 5/2001 | Suzuki et al. |
| 6,759,452 | B2 | 7/2004 | Border et al. |

(Continued)

FOREIGN PATENT DOCUMENTS

| | | |
|---|---|---|
| EP | 1721923 A1 | 11/2006 |
| JP | 2005325306 A * | 11/2005 |

(Continued)

OTHER PUBLICATIONS

Ying-Ling Liu, Chih-Yuan Hsu, Keh-Ying Hsu, "Poly(methylmethacrylate)-silica nanocomposites films from surface-functionalized silica nanoparticles", Polymer 2005, 46, 1851-1856.*

(Continued)

*Primary Examiner* — Richard A Huhn
(74) *Attorney, Agent, or Firm* — Cantor Colburn LLP

(57) ABSTRACT

A method of preparing a polycarbonate nanocomposite comprising forming a reactant mixture comprising a nanomaterial, a solvent, a dihydroxy compound and an activated carbonate; and polymerizing the dihydroxy compound and the activated carbonate in the presence of the solvent to form the polycarbonate nanocomposite is disclosed. Also disclosed are polycarbonate nanocomposites prepared in accordance with this method, and thermoplastic compositions comprising the polycarbonate nanocomposites. Also disclosed are polycarbonate compositions comprising the nanomaterial.

21 Claims, 5 Drawing Sheets

SAXS Plot for Example 13

(56) References Cited

U.S. PATENT DOCUMENTS

| | | |
|---|---|---|
| 6,790,929 B2 | 9/2004 | Silvi et al. |
| 7,026,432 B2 | 4/2006 | Charati et al. |
| 2003/0236384 A1* | 12/2003 | Silvi et al. ................ 528/86 |
| 2005/0137310 A1 | 6/2005 | Gupta et al. |
| 2006/0069199 A1 | 3/2006 | Charati et al. |
| 2006/0167139 A1 | 7/2006 | Nelson et al. |
| 2008/0033097 A1 | 2/2008 | Hayata et al. |

FOREIGN PATENT DOCUMENTS

| | | |
|---|---|---|
| WO | 03106149 A1 | 12/2003 |
| WO | 2005082972 A1 | 9/2005 |

OTHER PUBLICATIONS

Nissan Chemical America Corporation, website capture of Organosilicasol product data, captured Aug. 7, 2009.*

IUPAC Goldbook, entry for "in-situ composite formation," accessed on Jan. 9, 2012.*

Nissan Chemical America Corporation, webpage for Organosilicasol, retrieved on Oct. 4, 2013.*

G. Beaucage. Small-Angle Scattering from Polymeric Mass Fractals of Arbitrary Mass-Fractal Dimension. J. Appl. Cryst. (1996). 29, pp. 134-146.

Xinyu Huang, Stewart Lewis, William J. Brittain, Richard A. Vaia. Synthesis of Polycarbonate-Layered Silicate Nanocomposites via Cyclic Oligomers. Macromolecules, vol. 33, No. 6, 2000, pp. 2000-2004.

James A. Lake. An Iterative Method of Slit-Correcting Small Angle X-ray Data. Acta Cryst. (1967) 23, pp. 191-194.

Ying-Ling Liu, Chih-Yuan Hsu, Keh-Ying Hsi; "Poly(methylmethacrylate)-silica nanocomposites films from surface-functionalized silica nanoparticles", Polymer 2005, 46; pp. 1851-1856.

Mallikarjuna, S. R.; Tosh, B.; Sivaram S.; "Synthesis of Polycarbonate-Clay Nanocomposites via In Situ Polymerization" CAPLUS Aug. 10, 2005 (pp. 1-3).

Masaki Mitsunaga, Yasuhito Ito, Suprakas Sinha Ray, Masami Okamoto, Katsuhiko Hironaka. Intercalated Polycarbonate/Clay Nanocomposites: Nanostructure Control and Foam Processing—copied Feb. 27, 2007, Abstract pp. 1-3. http://www3.interscience.wiley.com/cgi-bin/abstract/104542803/ABSTRACT.

Nissan Chemical America Corporation; Website Capture of Organosilicasol Product Data; Captured Aug. 7, 2009.

International Search Report for PCT/US2007/074434 (Reference No. 200017) International Filing Date Jul. 26, 2007, Mailing Date Jan. 30, 2008, (6 pages).

Written Opinion of the International Searching Authority for PCT/US2007/074434 (Reference No. 200017) International Filing Date Jul. 26, 2007, Mailing Date Jan. 30, 2008, (7 pages).

PCT International Search Report for International Application No. PCT/US2007/079689; International Filing Date: Sep. 27, 2007; 14 Pages.

Polymeric Nanocomposites—copied Feb. 27, 2007, pp. 1-3. http://www2.uakron.edu/cpspe/wjb/research/nanocomposite%20summary.html.

J.A. Potton, G.J. Daniell, B.D. Rainford. Particle Size Distributions from SANS Data Using the Maximum Entropy Method. J. Appl. Cryst. (1988). 21, pp. 663-668.

J.A. Potton, G.J. Daniell, B.D. Rainford. A New Method for the Determination of Particle Size Distributions from Small-Angle Neutron Scattering Measurements. J. Appl. Cryst. (1988), 21, pp. 891-897.

Sigma-Aldrich Co.; Website Capture of Fumed Silica Product Data; Captured Aug. 7, 2009.

Sigma Aldrich Co., fumed silica data sheet, Jun. 2003.

Wikipedia entry for Polycarbonate; Accessed from http://en.wikipedia.org/wiki/Polycarbonate on May 28, 2010.

Youngjae Yoo, Kil-Yeong Choi, Jae Heun Lee. Polycarbonate/Montmorillonite Nanocomposites Prepared by Microwave-Aided Solid State Polymerization—copied Feb. 27, 2007, pp. 1-3. http://www3.interscience.wiley.com/cgi-bin/abstract/109608259/ABSTRACT.

P.J. Yoon, D.L. Hunter, D.R. Paul. Polycarbonate Nanocomposites. Part 1. Effect of organoclay structure on morphology and properties. Polymer 44 (2003), pp. 5323-5339.

* cited by examiner

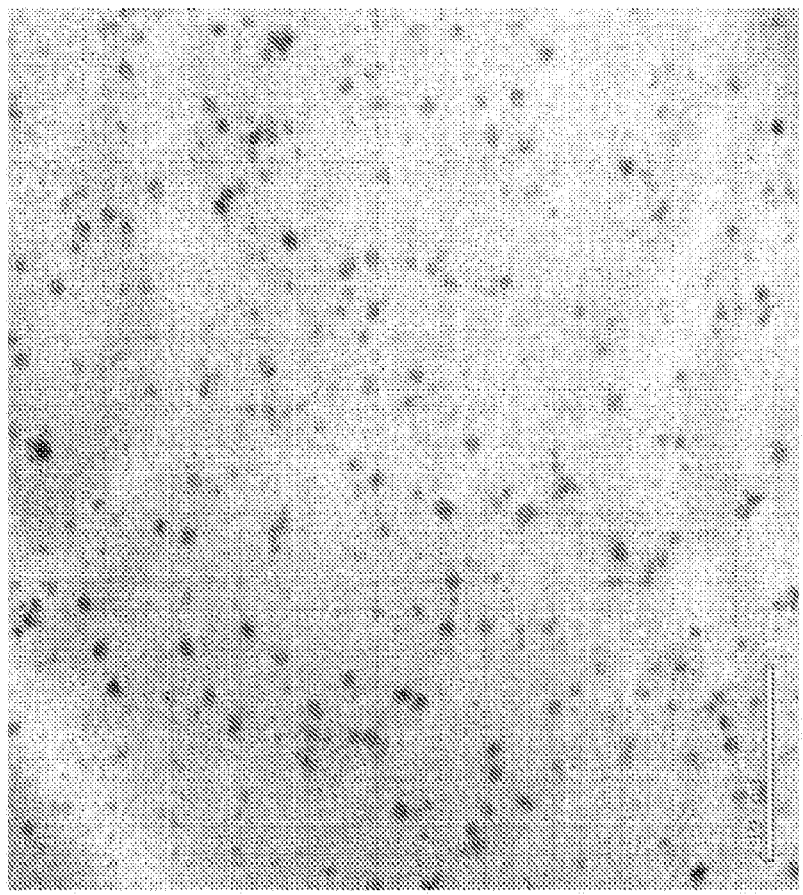
Fig 1 - TEM for Example 7

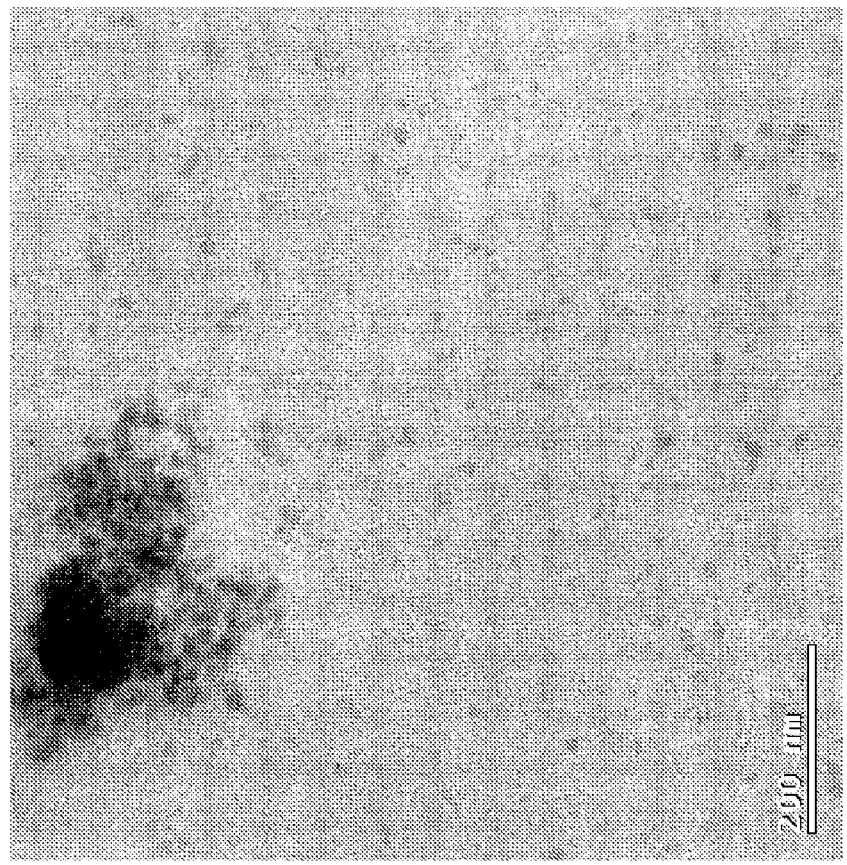
Fig 2 - TEM for CE-1

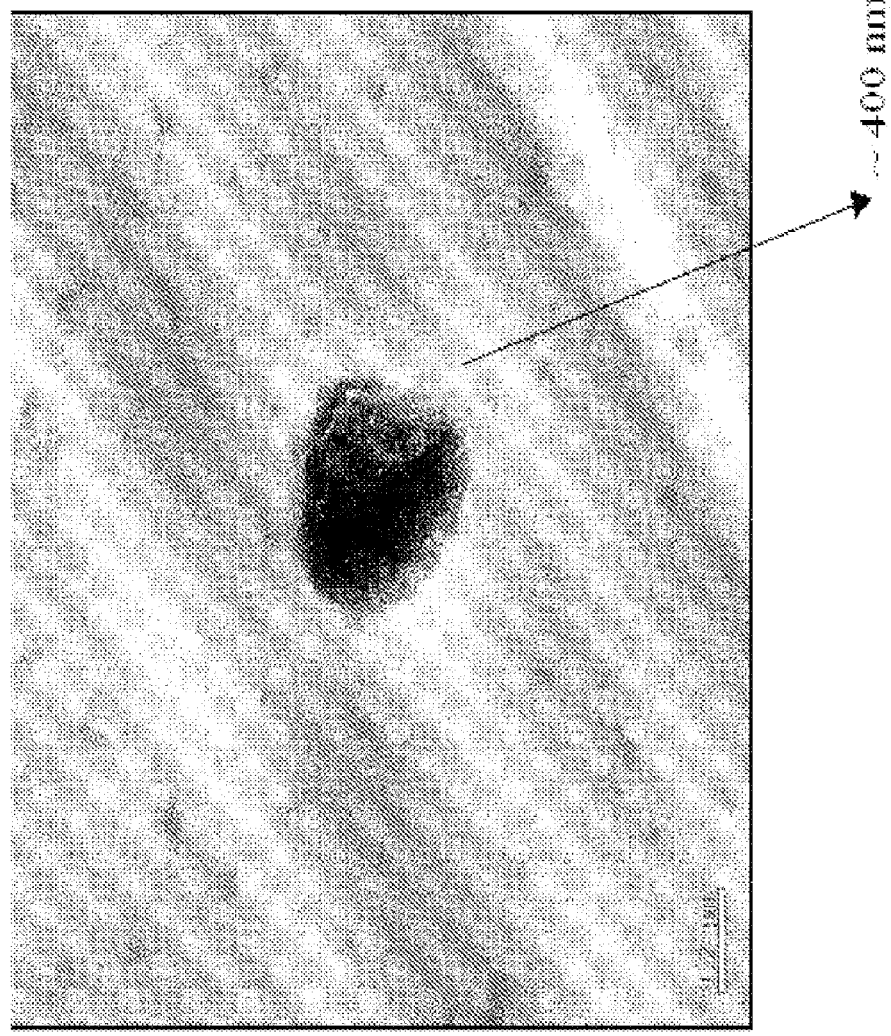
Figure 3 - TEM for CE-3

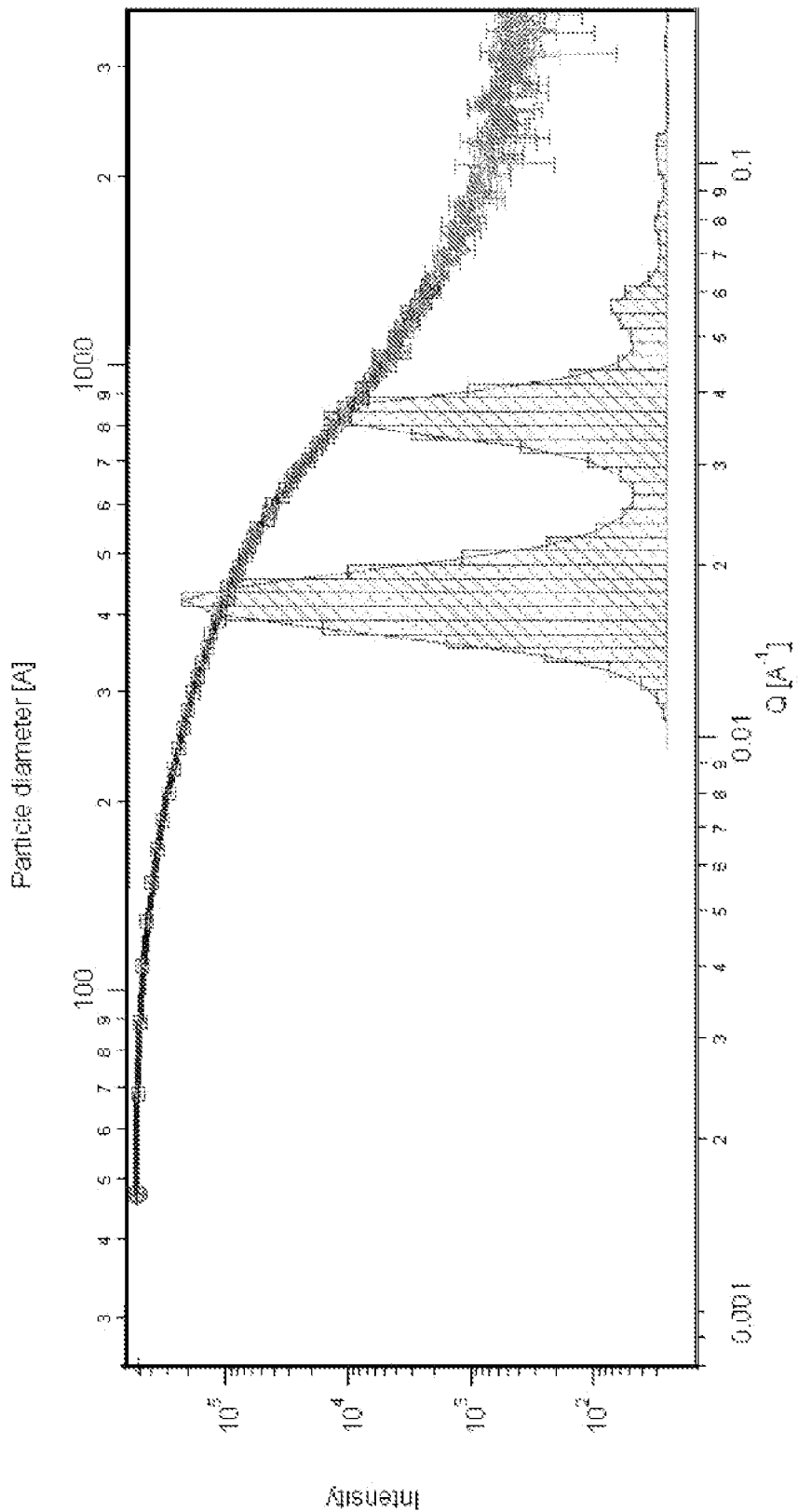
Figure 4 – SAXS Plot for Example 13

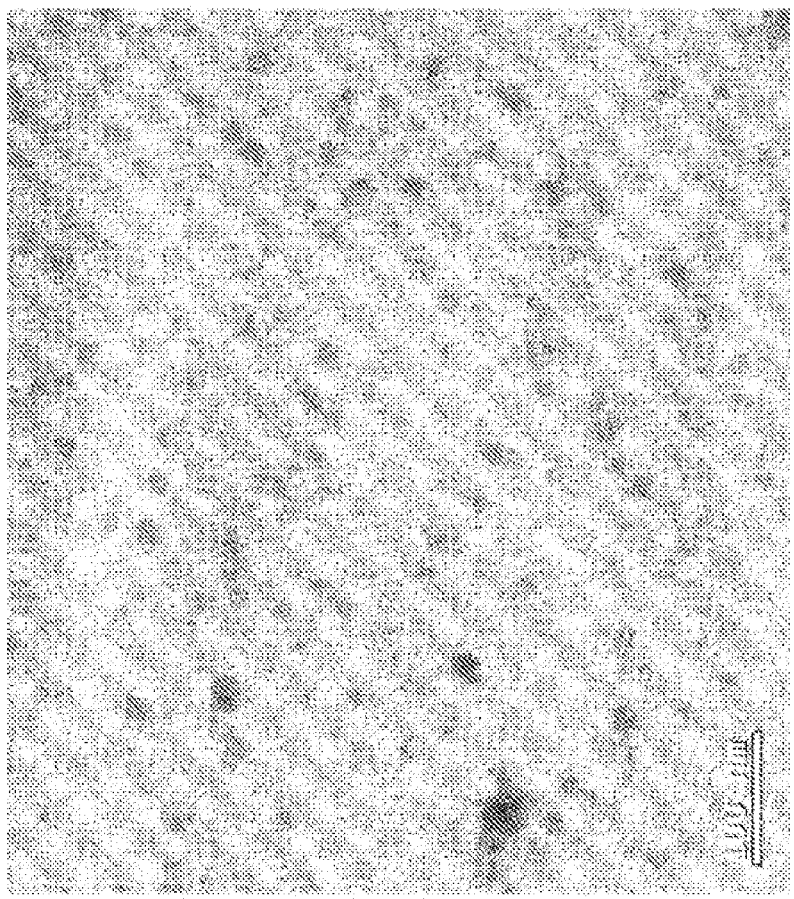
Figure 5 - TEM for Example 13

POLYCARBONATE COMPOSITION COMPRISING NANOMATERIALS

CROSS-REFERENCE TO RELATED APPLICATIONS

This application is a continuation of U.S. application Ser. No. 11/846,945, filed Aug. 29, 2007, which is incorporated herein in its entirety, and which is a continuation-in-part of U.S. application Ser. No. 11/536,867, filed Sep. 29, 2006.

BACKGROUND

Polymer nanocomposites comprising polymers and inorganic materials have attracted much attention as they have better properties relative to more conventional polymer composites comprising traditional particulate filler materials. The formation of nanocomposites comprising thermoplastic polymers, such as a polycarbonate matrix polymer and an inorganic nanomaterial as filler, is known to be a difficult process, mainly due to incompatibility between the nanomaterial and the polycarbonate domains. As a result, the nanomaterial remains largely localized in the form of agglomerates in the polycarbonate matrix, thereby leading to a poorer dispersion of the nanomaterial in the polymer matrix. Therefore, a relatively higher amount of nanomaterial may be required to achieve the desired degree of dispersion of the nanomaterials in the polymer matrix and form polycarbonate nanocomposites having significantly improved physical properties, such as, for example, increased hardness, extension-modulus, and the like. Further, the use of a higher amount of an inorganic nanomaterial can result in a polycarbonate nanocomposite having inferior optical properties, such as for example, reduced transparency or increased haze. Common approaches of melt-mixing or solution-mixing the polycarbonate and the nanomaterial may not lead to the formation of nanocomposites having a nanoscale dispersion of the nanomaterials in the polycarbonate matrix.

Therefore, it would be desirable to identify methods for preparing polymer nanocomposites comprising a polycarbonate and nanomaterials such that the nanocomposites have improved physical properties and performance characteristics, such as extension-modulus, hardness, transparency, and combinations of the foregoing properties.

SUMMARY OF THE INVENTION

In one embodiment, a method for preparing a polycarbonate nanocomposite comprises: forming a reactant mixture comprising a nanomaterial, a solvent, a dihydroxy compound and an activated carbonate; and polymerizing the dihydroxy compound and the activated carbonate in the presence of the solvent to form the polycarbonate nanocomposite.

In another embodiment, a method of preparing a polycarbonate nanocomposite comprises: forming a reactant mixture comprising a nanomaterial, a solvent, a dihydroxy compound and an activated carbonate; and polymerizing the dihydroxy compound and the activated carbonate in the presence of the solvent to form the polycarbonate nanocomposite, wherein the amount of nanomaterial is between 0.1 and 10 weight percent based on the total weight of the nanocomposite, and the nanomaterial comprises nanoclays or nanosilica. In an embodiment, the nanomaterial may be a nanoclay or a nanosilica.

In another embodiment a polycarbonate composition comprises an aromatic polycarbonate, 0.1 to 10 percent by weight of the total composition of a nanomaterial, wherein greater than 90% by volume of the particles of the nanomaterial in the composition have a particle diameter less than 50 nm as measured by SAXS.

The polycarbonate nanocomposite formed by the method is disclosed. In another embodiment, a thermoplastic composition comprising the polycarbonate nanocomposite is also disclosed.

The disclosure may be understood more readily by reference to the following detailed description and the examples included therein.

BRIEF DESCRIPTION OF DRAWINGS

FIG. 1 represents a Transmission Electron Micrograph (TEM) showing the morphology of the polycarbonate nanocomposite prepared in Example 7.

FIG. 2 represents a TEM showing the morphology of a polycarbonate nanocomposite prepared in Comparative Example 1.

FIG. 3 represents a TEM showing the morphology of a polycarbonate nanocomposite prepared in Comparative Example 3.

FIG. 4 represents a SAXS plot showing the particle size distribution of Example 13.

FIG. 5 represents a TEM showing the morphology of a polycarbonate nanocomposite prepared in Example 13.

DETAILED DESCRIPTION OF THE INVENTION

Disclosed herein is a method for preparing a polycarbonate nanocomposite comprising a polycarbonate and a nanomaterial. The polycarbonate nanocomposites prepared herein can be used in display films, optical applications, automotives, medical and packaging applications where a combination of properties like transparency, hardness, extension-modulus, scratch resistance, flame retardance, good melt flow for moldability, and thermal expansion are required.

In one embodiment, a method of preparing a polycarbonate nanocomposite comprises forming a reactant mixture comprising a nanomaterial, a solvent, a dihydroxy compound and an activated carbonate; and polymerizing the dihydroxy compound and the activated carbonate in the presence of the solvent to form the polycarbonate nanocomposite. In an embodiment, the method further comprises blending a polymer with the polycarbonate nanocomposite to form a polymer blend.

In another embodiment, a method of preparing a polycarbonate nanocomposite comprises forming a reactant mixture comprising a nanomaterial, a solvent, a dihydroxy compound and an activated carbonate; and polymerizing the dihydroxy compound and the activated carbonate in the presence of the solvent to form the polycarbonate nanocomposite, wherein the amount of nanomaterial is between 0.1 and 10 percent by weight of the nanocomposite, and the nanomaterial comprises nanoclay or nanosilica.

In another embodiment, a method of preparing a polycarbonate nanocomposite comprises forming a reactant mixture comprising a nanoclay, a solvent, a dihydroxy compound and an ester-substituted activated carbonate; and polymerizing the dihydroxy compound and the activated carbonate in the presence of the solvent to form the polycarbonate nanocomposite, wherein the amount of nanoclay is between 0.1 and 10 weight percent based on the total weight of the nanocomposite.

In another embodiment, a method of preparing a polycarbonate nanocomposite comprises forming a reactant mixture comprising a functionalized nanosilica, a solvent, a compatibilizer, a dihydroxy compound and an ester-substituted activated carbonate; and polymerizing the dihydroxy compound and the activated carbonate in the presence of the solvent to form the polycarbonate nanocomposite, wherein the amount of nanosilica is between 0.1 and 10 weight percent based on the total weight of the nanocomposite.

In another embodiment a polycarbonate composition comprises an aromatic polycarbonate, 0.1 to 10 percent by weight of the total composition of a nanomaterial, wherein greater than 90% by volume of the particles of the nanomaterial in the composition have a particle diameter less than 50 nm as measured by SAXS.

In an embodiment, greater than 95% by volume of the particles of the composition have a particle diameter less than 50 nm as measured by SAXS. In an embodiment the nanomaterial comprises nanosilica, nanoclay, nanotalc, nanoalumina or a combination of two or more of the nanomaterials.

In an embodiment, the polycarbonate is prepared by a melt process. In another embodiment, the polycarbonate is prepared by in-situ polymerization.

The polycarbonate nanocomposite prepared by the method, articles comprising the polycarbonate composition, and a thermoplastic composition comprising the polycarbonate nanocomposite prepared by the method are also disclosed.

The singular forms "a", "an" and "the" include plural referents unless the context clearly dictates otherwise. All ranges disclosed herein are inclusive of the recited endpoint and independently combinable (for example ranges of "from about 2 grams to about 10 grams" is inclusive of the endpoints and all the intermediate values of the ranges of 2 grams to about 10 grams).

The modifier "about" used in connection with a quantity is inclusive of the stated value and has the meaning dictated by the context (for example, includes the degree of error associated with the measurement of the particular quantity).

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the term "cycloaliphatic functionality" designates cyclic aliphatic functionalities having a valence of at least one and comprising an array of atoms which is cyclic but which is not aromatic. A cycloaliphatic functionality may comprise one or more noncyclic components. For example, a cyclohexylmethyl group ($C_6H_{11}CH_2$) is a cycloaliphatic functionality, which comprises a cyclohexyl ring (the array of atoms which is cyclic but which is not aromatic) and a methylene group (the noncyclic component). The cycloaliphatic functionality may include heteroatoms such as nitrogen, sulfur, selenium, silicon and oxygen, or may be composed exclusively of carbon and hydrogen. For convenience, the term cycloaliphatic functionality is defined herein to encompass a wide range of functional groups such as alkyl groups, alkenyl groups, alkynyl groups, haloalkyl groups, conjugated dienyl groups, alcohol groups, ether groups, carboxylic acid groups, acyl groups (for example carboxylic acid derivatives such as esters and amides), amine groups and nitro groups. For example, the 4-methylcyclopent-1-yl group is a $C_6$ cycloaliphatic functionality comprising a methyl group, wherein the methyl group is a functional group that is an alkyl group. Similarly, the 2-nitrocyclobut-1-yl group is a $C_4$ cycloaliphatic functionality comprising a nitro group, wherein the nitro group is a functional group. A cycloaliphatic functionality may comprise one or more halogen atoms which may be the same or different. Exemplary cycloaliphatic functionalities comprise cyclopropyl, cyclobutyl, 1,1,4,4-tetramethylcyclobutyl, piperidinyl, 2,2,6,6-tetramethylpiperydinyl, cyclohexyl and cyclopentyl.

As used herein, the term "aromatic functionality" refers to an array of atoms having a valence of at least one comprising at least one aromatic group. The array of atoms having a valence of at least one, comprising at least one aromatic group, may include heteroatoms such as nitrogen, sulfur, selenium, silicon and oxygen, or may be composed exclusively of carbon and hydrogen. As used herein, the term aromatic functionality includes but is not limited to, phenyl, pyridyl, furanyl, thienyl, naphthyl, phenylene, and biphenyl functionalities. The aromatic functionality may also include nonaromatic components. For example, a benzyl group is an aromatic functionality that comprises a phenyl ring (the aromatic group) and a methylene group (the nonaromatic component). Similarly a tetrahydronaphthyl functionality is an aromatic functionality comprising an aromatic group ($C_6H_3$) fused to a nonaromatic component ($CH_2)_4$. For convenience, the term aromatic functionality is defined herein to encompass a wide range of functional groups such as alkyl groups, haloalkyl groups, haloaromatic groups, alcohol groups, ether groups, carboxylic acid groups, acyl groups (for example carboxylic acid derivatives such as esters and amides), amine groups and nitro groups. For example, the 4-methylphenyl functionality is a $C_7$ aromatic functionality comprising a methyl group, wherein the methyl group is a functional group, which is an alkyl group. Similarly, the 2-nitrophenyl group is a $C_6$ aromatic functionality comprising a nitro group, wherein the nitro group is a functional group. Aromatic functionalities include halogenated aromatic functionalities. Exemplary aromatic functionalities include, but are not limited to, phenyl, 4-trifluoromethylphenyl, 4-chloromethylphen-1-yl, 3-trichloromethylphen-1-yl (3-$CCl_3$Ph-), 4-(3-bromoprop-1-yl)phen-1-yl (4-$BrCH_2CH_2CH_2$Ph-), 4-aminophen-1-yl (4-$H_2$NPh-), 4-hydroxymethylphen-1-yl (4-HOCH2Ph-), 4-methylthiophen-1-yl (4-CH3SPh-), 3-methoxyphen-1-yl and 2-nitromethylphen-1-yl (2-$NO_2CH_2$Ph), and naphthyl.

As used herein the term "aliphatic functionality" refers to a linear or branched array of atoms that is not cyclic and has a valence of at least one. Aliphatic functionalities are defined to comprise at least one carbon atom. The array of atoms may include heteroatoms such as nitrogen, sulfur, silicon, selenium and oxygen or may be composed exclusively of carbon and hydrogen. For convenience, the term aliphatic functionality is defined herein to encompass, as part of the "linear or branched array of atoms which is not cyclic" a wide range of functional groups such as alkyl groups, haloalkyl groups, alcohol groups, ether groups, carboxylic acid groups, acyl groups (for example carboxylic acid derivatives such as esters and amides), amine groups and nitro groups. For example, the 4-methylpent-1-yl is a $C_6$ aliphatic functionality comprising a methyl group, wherein the methyl group is a functional group, which is an alkyl group. Similarly, the 4-nitrobut-1-yl group is a $C_4$ aliphatic functionality comprising a nitro group, wherein the nitro group is a functional group. An aliphatic functionality may be a haloalkyl group which comprises one or more halogen atoms which may be the same or different. Exemplary aliphatic functionalities include, but are not limited to, methyl, ethyl, propyl, isopropyl, butyl, isobutyl, pentyl, isopentyl, trifluoromethyl, bromodifluoromethyl, chlorodifluoromethyl, chloromethyl, trichloromethyl, bromoethyl, 2-hexyl, hexamethylene, hydroxymethyl (i.e., $CH_2OH$), mercaptomethyl ($CH_2SH$), methylthio ($SCH_3$), methylthiomethyl ($CH_2SCH_3$), methoxy, methoxycarbonyl ($CH_3OCO$), nitromethyl ($CH_2NO_2$) and thiocarbonyl.

In one embodiment, a method for producing the polycarbonate nanocomposite comprises forming a reactant mixture comprising a nanomaterial, a solvent, a dihydroxy compound, and an activated carbonate; and polymerizing the dihydroxy compound and the activated carbonate in the presence of the solvent to form the polycarbonate nanocomposite.

Suitable dihydroxy compounds that can be used for the preparation of the polycarbonate nanocomposite have Formula (I):

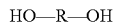
HO—R—OH  (I);

wherein R comprises an aliphatic functionality having about 2 to about 30 carbon atoms, an aromatic functionality having about 6 to about 40 carbon atoms, a cycloaliphatic functionality having about 3 to about 40 carbon atoms, or R comprises a combination of two or more of the aliphatic, aromatic, or cycloaliphatic functionalities described above. Specific non-limiting examples of dihydroxy compounds of Formula (I) include, 4,4'-(3,3,5-trimethylcyclohexylidene) diphenol, 4,4'-bis(3,5-dimethyl)diphenol, 1,1-bis(4-hydroxy-3-methylphenyl)cyclohexane, 4,4-bis(4-hydroxyphenyl)heptane, 2,4'-dihydroxydiphenylmethane, bis(2-hydroxyphenyl)methane, bis(4-hydroxyphenyl)methane, bis(4-hydroxy-5-nitrophenyl)methane, bis(4-hydroxy-2,6-dimethyl-3-methoxy-phenyl)methane, 1,1-bis(4-hydroxyphenyl)ethane, 1,1-bis(4-hydroxy-2-chloro-phenyl)ethane, 2,2-bis(4-hydroxyphenyl)propane, 2,2-bis(3-phenyl-4-hydroxy-phenyl)propane, 2,2-bis(4-hydroxy-3-methylphenyl)propane, 2,2-bis(4-hydroxy-3-ethylphenyl)propane, 2,2-bis(4-hydroxy-3-isopropylphenyl)propane, 2,2-bis(4-hydroxy-3,5-dimethylphenyl)propane, 2,2-bis(3,5,3',5'-tetrachloro-4,4'-dihydroxyphenyl)propane, bis(4-hydroxyphenyl)cyclohexylmethane, 2,2-bis(4-hydroxyphenyl)-1-phenylpropane, 2,4'-dihydroxyphenyl sulfone, 2,6-dihydroxy naphthalene, hydroquinone, resorcinol, $C_{1-3}$ alkyl-substituted resorcinols, 3-(4-hydroxyphenyl)-1,1,3-trimethylindan-5-ol, 1-(4-hydroxyphenyl)-1,3,3-trimethylindan-5-ol, 2,2,2',2'-tetrahydro-3,3,3',3'-tetramethyl-1,r-spiro-bi[1H-indene]-6,6'-diol, 1-methyl-1,3-bis(4-hydroxyphenyl)-3-isopropylcyclohexane, 1-methyl-2-(4-hydroxyphenyl)-3-[1-(4-hydroxyphenyl)isopropyl]cyclohexane, 1,6-hexanediol, 3-methyl-1,3-pentanediol, 1,7-heptanediol, 1,8-octanediol, 1,9-nonanediol, 1,10-decanediol, 1,4;3,6-dianhydro-D-glucitol (also sometimes called as "isosorbide"), 1,4;3,6-dianhydro-D-mannitol, 1,4;3,6-dianhydro-L-iditol, or a mixture of two or more of the foregoing dihydroxy compounds.

In one embodiment polycarbonate oligomers comprising structural units derived from the dihydroxy compounds of Formula (I) can also be used in place of the dihydroxy compound in the polymerization reaction. The structural units derived from the dihydroxy compounds of Formula (I) can be represented by Formula (II):

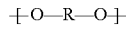
―[O—R—O]―  (II)

wherein R has the same meaning as described above.

As used herein, the term "nanomaterial" refers to a material made of particles having an average particle size range from 1 nanometer to about 500 nanometers, optionally from 1 nanometer to about 100 nanometers. Non-limiting examples of suitable nanomaterials that can be used for the preparation of nanocomposites comprise nanosilica, nanoclay, nanoalumina and nanotalc. Specific non-limiting examples of nanomaterials include nanoclay, silica nanoparticles, alumina nanoparticles, zirconia nanoparticles, titania nanoparticles, aluminum nanoparticles, aluminum nitride nanoparticles, aluminum oxide nanoparticles, antimony oxide nanoparticles, antimony pentoxide nanoparticles, antimony tin oxide nanoparticles, barium sulfate nanoparticles, barium titanate nanoparticles, bismuth oxide nanoparticles, boron nitride nanoparticles, brass nanoparticles, calcium carbonate nanoparticles, calcium chloride nanoparticles, calcium oxide nanoparticles, carbon nanoparticles, carbon black nanoparticles, ceramic nanoparticles, ceria nanoparticles, samarium doped cerium nanoparticles, cerium oxide nanoparticles, chromium oxide nanoparticles, cobalt nanoparticles, cobalt iron oxide nanoparticles, cobalt oxide nanoparticles, cobalt-zinc-iron oxide nanoparticles, copper nanoparticles, copper oxide nanoparticles, dysprosium oxide nanoparticles, erbium oxide nanoparticles, europium oxide nanoparticles, gadolinium oxide nanoparticles, gold nanoparticles, graphite nanoparticles, hafnium oxide nanoparticles, hastelloy nanoparticles, indium nanoparticles, indium hydroxide nanoparticles, indium oxide nanoparticles, indium tin oxide nanoparticles, iron nanoparticles, iron-cobalt alloy nanoparticles, iron-nickel alloy nanoparticles, iron oxide nanoparticles, iron sulfide nanoparticles, lanthanum nanoparticles, lanthanum oxide nanoparticles, lead oxide nanoparticles, lithium-manganese oxide nanoparticles, lithium-titanate nanoparticles, lithium-vanadium oxide nanoparticles, magnesia nanoparticles, magnesium nanoparticles, magnesium oxide nanoparticles, manganese nanoparticles, manganese oxide nanoparticles, molybdenum nanoparticles, molybdenum oxide nanoparticles, neodymium oxide nanoparticles, nickel nanoparticles, nickel-iron oxide nanoparticles, nickel oxide nanoparticles, nickel-titanium nanoparticles, nickel-zinc-iron oxide nanoparticles, niobia nanoparticles, niobium nanoparticles, niobium oxide nanoparticles, palladium nanoparticles, platinum nanoparticles, platinum-silver nanoparticles, praseodymium oxide nanoparticles, ruthenium nanoparticles, samarium oxide nanoparticles, silicon nanoparticles, silicon carbide nanoparticles, silicon oxide nanoparticles (hereinafter referred to as "nanosilica"), silicon nitride nanoparticles, silicon nitride-yttrium oxide nanoparticles, silicon nitride-yttrium oxide-aluminum oxide nanoparticles, silver nanoparticles, stainless steel nanoparticles, strontium carbonate nanoparticles, strontium-titanate nanoparticles, talc nanoparticles, tantalum nanoparticles, terbium oxide nanoparticles, tin nanoparticles, tin oxide nanoparticles, titanium nanoparticles, titanium carbide nanoparticles, titanium-carbonitride nanoparticles, titanium diboride nanoparticles, titanium oxide nanoparticles, titanium nitride nanoparticles, tungsten nanoparticles, tungsten carbide nanoparticles, tungsten carbide-cobalt nanoparticles, tungsten oxide nanoparticles, vanadium oxide nanoparticles, yttria nanoparticles, yttrium nanoparticles, yttrium-aluminum oxide nanoparticles, yttrium oxide nanoparticles, zinc nanoparticles, zinc-iron oxide nanoparticles, zinc oxide nanoparticles, zinc sulfide nanoparticles, zirconium nanoparticles, zirconium oxide nanoparticles, zirconium silicate nanoparticles or a combination of two or more of the foregoing nanomaterials.

In one embodiment, the amount of nanomaterial used is about 0.1 weight percent to about 10 weight percent based on the total weight of the nanocomposite. Within this range the amount may be greater than or equal to 1 weight percent, or more specifically, greater than or equal to about 2 weight percent based on the total weight of the nanocomposite. Also within this range the amount may be less than or equal to about 8 weight percent, or more specifically less than or equal to about 7 weight percent, based on the weight of the nanocomposite. In some embodiments, the amount of nanomaterial is from 1 weight percent to 5 weight percent based on the total weight of the nanocomposite.

As used herein, the term "nanosilica" refers to a material made of particles having an average particle size range from 1 nanometer to about 100 nanometers. The nanosilica may be unfunctionalized nanosilica or functionalized nanosilica, such as partially functionalized nanosilica or completely functionalized nanosilica. Combinations of the unfunctionalized, partially functionalized, or completely functionalized nanosilica may also be used. As defined herein, a partially functionalized nanosilica is defined as a nanosilica wherein about 20 to about 50 percent of free hydroxyl groups present in the particles of the unfunctionalized nanosilica are functionalized with organometallic groups. Examples of organometallic groups include organo-silane groups, organo-titanate groups and organo-zirconate groups. As defined herein, a completely functionalized nanosilica is defined as a nanosilica wherein greater than 50 percent of free hydroxyl groups present in the particles of the unfunctionalized nanosilica are functionalized with organometallic groups. In one embodiment, the unfunctionalized nanosilica can be completely functionalized, or the partially functionalized nanosilica can be completely functionalized, before being used in the preparation of the polycarbonate nanocomposite by treatment with suitable organometallic functionalizing agents, such as for example hexamethyldisilazane.

Specific non-limiting examples of functionalizing agents used to functionalize nanosilica include organo-silanes and organo-siloxanes, organo-titanates or organo-zirconates. In one embodiment, the functionalizing agents are organo-silane compounds wherein at least one organic group is a reactive group. Typical reactive groups are hydroxyl groups, alkoxy groups such as methoxy groups and ethoxy groups, hydride groups, and halogen groups such as chloro groups. Suitable functionalizing agents include trialkyl silanol, such as trimethyl silanol, triethyl silanol, methylethyl silanol, and the like; trimethyl chlorosilane; dimethyl dichlorosilane; and trimethyl hydrosilane. In another embodiment, oligomeric linear or cyclic siloxanes may be used as the functionalizing agent, such as octamethyltetrasiloxane, hexamethyltrisiloxane. Other non-limiting examples of organo-silanes include phenyltrimethoxy silane, diphenyldimethoxy silane, polyethyleneglycoltrimethoxy silane, phenethyltrimethoxy silane, gammamethacryloxypropyltrimethoxy silane, gammaminopropyltrimethoxy silane, glycydoxypropyltrimethoxy silane, N-aminoethyl-3-aminopropyltrimethoxy silane, aminoethylaminopropylmethyldimethoxy silane, aminoethylaminopropyltrimethoxy silane, methyltrimethoxy silane, methyltriethoxy silane, mercaptopropyltrimethoxy silane, mercaptopropylmethyldimethoxy silane, chloropropyltrimethoxy silane, chloropropyltriethoxy silane, chloropropylmethyldimethoxy silane, phenyltriethoxy silane, diphenyldiethoxy silane, polyethyleneglycoltriethoxy silane, phenethyltriethoxy silane, gammamethacryloxypropyltriethoxy silane, gammaminopropyltriethoxy silane, glycydoxypropyltriethoxy silane, N-aminoethyl-3-aminopropyltriethoxy silane, hexamethyldisilazane, and a combination of two or more of the foregoing organo-silanes.

Suitable non-limiting examples of organo-titanium compounds include titanium IV 2-propanolato, tris isooctadecanoato-O; titanium IV 2-propanolato, tris(dodecyl)benzenesulfonato-O; titanium IV 2-propanolato, tris(dioctyl) pyrophosphato-O; titanium IV tetrakis 2-propanolato, adduct 2 moles (dioctyl)hydrogen phosphite; titanium IV tetrakis (bis 2-propanolato methyl)-1-butanolato, adduct 2 moles (ditridecyl)hydrogen phosphite; titanium IV oxoethylene-diolato, bis isooctadecanoato-O; titanium IV oxoethylene-diolato, bis(dioctyl) phosphato-O; titanium IV oxoethylene-diolato, bis[4-(2-phenyl)-2-propyl-2]phenolate; titanium IV oxoethylene-diolato, bis(dioctyl)pyrophosphato-O; titanium IV ethylenediolato, bis(dioctyl)pyrophosphato-O, titanium IV 2,2(bis 2-propenolatomethyl) butanolato, tris neodecanoato-O; titanium IV 2,2(bis 2-propenolatomethyl) butanolato, tris (dodecyl) benzenesulfonato-O; 12 titanium IV 2,2(bis 2-propenolatomethyl) butanolato, tris (dioctyl) phosphato-O; titanium IV 2,2(bis 2-propenolatomethyl) butanolato, tris (dioctyl) pyrophosphato-O; titanium IV 2,2 (bis 2-propenolatomethyl) butanolato, tris (dioctyl) pyrophosphato-O ethoxylated nonyl phenol-1:1; titanium IV (bis-2-propenolato-methyl)-1-butanolato, bis(dioctyl) pyrophosphato-O, (adduct) 3 moles N,N-dimethylaminoalkyl propenoamide; titanium IV 2,2(bis 2-propenolatomethyl), tris 2-ethylenediamino) ethylato; and titanium IV 2,2 (bis 2-propenolatomethyl) butanolato, tris (3-amino) phenylato.

Suitable non-limiting examples of organo-zirconates include zirconium IV tetrakis (2,2-bispropenolatomethyl) butanolato as an adduct with 2 moles bis tridecyl hydrogen phosphite; zirconium IV 2,2(bis-2-propenolatomethyl) butanolato, tris(dioctyl)phosphato-O; zirconium IV bis 2,2 (bis-2-propenolatomethyl) butanolato, bis(paraminobenzoato-O); zirconium IV 2,2(bis-2-propenolatomethyl) butanolato, tris (dioctyl)pyrophosphato-O; zirconium IV 2,2 (bis-2-propenolatomethyl), tris (2-ethylenediamino) ethylato; and zirconium IV (2,2-bis propenolatomethyl), tris (3-amino) phenylato-O.

As used herein the term, "nanoclay" refers to an untreated nanoclay, a functionalized clay, or any combinations thereof. The term "functionalized nanoclay" refers to a nanoclay that has been treated with a functionalizing agent. The functionalizing agent generally increases the distance between the sheet-like layers (explained further below) present in the untreated nanoclay, thereby leading to a functionalized nanoclay.

Suitable non-limiting examples of nanoclays include, apophyllite, bannisterite, carletonite, cavansite, chrysocolla, the clay group of phyllosilicates, delhayelite, elpidite, fedorite, linfurnaceite, gonyerite, gyrolite, leucosphenite, the mica group of phyllosilicates, minehillite, nordite, pentagonite, petalite, prehnite, rhodesite, sanbornite, and the serpentine group of phyllosilicates. Specific non-limiting examples of the clay group of phyllosilicates include, chlorite clays such as baileychlore, chamosite, general categories of chlorite mineral, cookeite, nimite, pennantite, penninite and sudoite; glauconite, illite, kaolinite, montmorillonite, palygorskite, pyrophyllite, sauconite, talc, and vermiculite. Specific non-limiting examples of the mica group of phyllosilicates include, biotite, lepidolite, muscovite, paragonite, phlogopite, and zinnwaldite. Specific non-limiting examples of serpentine phyllosilicates include, those having a structure composed of layers of silicate tetrahedrons linked into sheets with layers of magnesium hydroxide interspersed between the silicate sheets, such as, for example, antigorite [(Mg, Fe)$_3$Si$_2$O$_5$(OH)$_4$, having a monoclinic structure]; clinochrysotile [Mg$_3$Si$_2$O$_5$(OH)$_4$, having a monoclinic structure]; lizardite [Mg$_3$Si$_2$O$_5$(OH)$_4$, having either a trigonal or a hexagonal structure); orthochrysotile [Mg$_3$Si$_2$O$_5$(OH)$_4$, having an orthorhombic structure]; and parachrysotile [(Mg, Fe)$_3$Si$_2$O$_5$(OH)$_4$, having an orthorhombic structure].

Untreated clays generally have sheet-like structures, due in part to the presence of rings of tetrahedrons linked by oxygen atoms and shared with other rings in a two dimensional plane. Layers of cations, such as sodium ions, connect the sheet-like structures. These layers of cations that connect the sheet-like structures are hereinafter referred to as interlayers. The cations are weakly bonded and are surrounded by neutral molecules, such as water molecules. The silicon to oxygen ratio in the untreated clay is generally from about 1:1 to about 2.5:1. The cohesive energy between the interlayer and the cation layer is relatively strong, and unless treated suitably, the interlayer will not allow the entry of organic polymer molecules between the layers of the untreated clay.

The untreated clay can be functionalized with a functionalizing agent to obtain a functionalized clay, which can also be used in the preparation of the polycarbonate nanocomposite. Suitable functionalizing agents can increase the d-spacing so as to facilitate incorporation of polymer molecules. The functionalizing agent also serves to compatibilize the interlayers of the untreated clay with polymer molecules (example, a polycarbonate) to form a polymer nanocomposite. The functionalization can be carried out by using functionalizing agents such as imidazolium, phosphonium, ammonium and phthalimide compounds, by employing methods generally known to a person skilled in the art. Typically, the functionalization is achieved by a cation-exchange reaction between the untreated clay and the functionalizing agent. Generally, the functionalizing agent is used in an amount that is twice the experimentally measured exchange capacity of the untreated clay. The functionalizing agent is dissolved in a solvent, such as an alcohol-water mixture (example, 50 by 50 volume by volume) followed by the addition of the untreated nanoclay. The mixture thus formed is heated for a sufficient time to obtain the functionalized clay.

As used herein the term "polymerizing in the presence of the solvent" is to be understood to mean that at least 10 percent of the solvent initially present in the reaction mixture remains in the reaction mixture until after the start of polymerization. In one embodiment at least 10 percent of the solvent initially present in the reaction mixture remains until a degree of polymerization greater than 4 is reached. In one embodiment at least 50 percent of the solvent remains until an average degree of polymerization of 4 is reached.

The nanomaterials are available in powder form, in the form of a dispersion in a solvent, or in the form of an aqueous dispersion. They are available in completely functionalized, partially functionalized and unfunctionalized forms. An example of a partially functionalized nanosilica is Snowtex Organosilicasol™ MEK-ST, a partially functionalized nanosilica having a volume average particle size of about 10 to 15 nm diameter, and commercially available as a 30 weight percent dispersion in methylethyl ketone from Nissan Chemical, U.S.A. The functionalizing agents react with the reactive surface groups and create an organic layer or shell, which prevents the nanomaterial particles from adhering to each other, thereby increasing the inter-particle distance ("IPD"). As used herein, the term "inter-particle distance" refers to an average value of the distance between the surfaces of any two particles of the nanomaterial dispersed in a polymer matrix (for example, a polycarbonate matrix). As used herein, the term "agglomerates" means that the IPD of the nanomaterials in a polycarbonate matrix is less than 0.05 nm and the particles are not uniformly distributed throughout the polycarbonate matrix. As used herein, the term "discrete" means that the IPD of the nanomaterials is about 0.05 nm to about 1500 nm and the particles are distributed throughout the polycarbonate matrix and not agglomerated. An example of a commercially available functionalized nanoclay is CLOISITE® 30B, which can be purchased from Southern Clay Products, Inc. As disclosed herein, the term "d-spacing" is defined as the distance between the sheet-like structures of a nanoclay. As disclosed herein, the term "exfoliated" as applied to a polycarbonate nanocomposite means at least approximately 80 percent of the sheet-like layers of the nanoclay are separated by a distance of greater than or equal to 4 nanometers in a polycarbonate matrix.

Suitable non-limiting examples of functionalizing agents for nanoclay include, 1,2 dimethyl-3-hexadecylimidazolium, 1-decyl-2,3-dimethylimidazolium, 1-butyl-2,3-dimethylimidazolium, 1,2-dimethyl-3-propylimidazolium, 1,2-dimethyl-3-hexadecylimidazolium, dimethyldioctadecyl ammonium bromide, Triphenyldodecyl phosphonium bromide, tributyltetradecylphosphonium bromide, tributylhexadecyl phosphonium bromide, tributyloctadecyl phosphonium bromide, tetraphenyl phosphonium bromide, tetraoctylphosphonium bromide, tetraoctylammonium bromide, triphenyl pyridinium chloride, Bis(2-hydroxyethyl)methyl tallow ammonium, bis(2-hydroxyethyl)methyl octadecyl ammonium, trimethyl tallow ammonium, trimethyl hydrogenated-tallow ammonium, dimethyl hydrogenated tallow ammonium, methyl bis(hydrogenated-tallow) ammonium, dimethyl bis(hydrogentated-tallow) ammonium, dimethyl benzyl hydrogenated-tallow ammonium, 12-aminolautic acid ammonium, bis(polyoxyethylene)methyl octadecyl ammonium, dimethyl bis(ethylene oxide-co [propylene oxide) ammonium, dimethyl bis(ethylene oxide-co-propylene oxide) ammonium, N-[4-(40-aminophenyl)]phenyl phthalimide, and N-[4-(40-aminophenoxy)]phenyl phthalimide.

In one embodiment, the amount of functionalizing agent used is about 5 weight percent to about 15 weight percent, based on the weight of nanomaterials employed. Within this range the amount may be greater than or equal to 7 weight percent, or more specifically, greater than or equal to about 9 weight percent, based on the amount of nanomaterials employed. Also within this range the amount may be less than or equal to about 12 weight percent, or more specifically less than or equal to about 10 weight percent, based on the amount of nanomaterials employed.

In one embodiment, when an unfunctionalized nanomaterial is used for the preparation of the polycarbonate nanocomposite, a compatibilizer must be added to the reactant mixture described above. The compatibilizer assists in reducing the interfacial tension between the nanomaterial and the polymer molecules (for example, a polycarbonate), thus facilitating the dispersion of the nanomaterial in the polymer matrix. The different functionalizing agents described above can be used as the compatibilizer. In various embodiments, the amount of the compatibilizer used is the same as the amount of the functionalizing agent as described above.

As used herein, the term "activated carbonate", also at times referred to as activated diarylcarbonate, is defined as a diarylcarbonate that is more reactive than diphenylcarbonate in transesterification reactions. In one embodiment, the activated carbonate has a Formula (III):

(III)

wherein Ar is a substituted aromatic functionality having 6 to 30 carbon atoms. In one embodiment, the activated carbonates have the more specific Formula (IV):

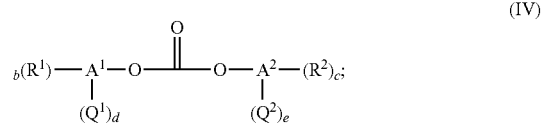

(IV)

wherein $Q^1$ and $Q^2$ are each independently an activating group present on $A^1$ and $A^2$ respectively, positioned ortho to the carbonate linkage. $A^1$ and $A^2$ are each independently aromatic rings which can be the same or different depending on the number and location of their substituent groups; "d" and "e" have a value of 0 to a maximum equivalent to the number of replaceable hydrogen groups substituted on the aromatic rings $A^1$ and $A^2$ respectively, wherein "d+e" is greater than or equal to 1. $R^1$ and $R^2$ are each independently an aliphatic functionality, a cycloaliphatic functionality, an aromatic functionality, cyano, nitro or a halogen. The number "b" has a value of 0 to a maximum equivalent to the number of replaceable hydrogen atoms on the aromatic ring $A^1$ minus the number "d", and the number "c" is a whole number of from 0 to a maximum equivalent to the number of replaceable hydrogen atoms on the aromatic ring $A^2$ minus the number "e". The number, type and location of the $R^1$ or $R^2$ substituents on the aromatic ring is not limited unless they deactivate the carbonate and lead to a carbonate, which is less reactive than diphenylcarbonate.

Non-limiting examples of suitable activating groups $Q^1$ and $Q^2$ include (alkoxycarbonyl)aryl groups, halogens, nitro groups, amide groups, sulfone groups, sulfoxide groups, or imine groups with structures shown below:

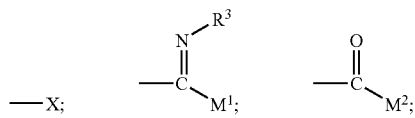

wherein X is halogen or nitro; $M^1$ and $M^2$ independently comprise N-dialkyl, N-alkylaryl, an aliphatic functionality or an aromatic functionality; and $R^3$ is an aliphatic functionality or an aromatic functionality.

Specific non-limiting examples of activated carbonates include bis(o-methoxycarbonylphenyl)carbonate, bis(o-chlorophenyl)carbonate, bis(o-nitrophenyl)carbonate, bis(o-acetylphenyl)carbonate, bis(o-phenylketonephenyl)carbonate, bis(o-formylphenyl)carbonate. Unsymmetrical combinations of these structures where the type and number of substitutions on $A^1$ and $A^2$ are different can also be used as the carbonate precursor. In one embodiment, the activated carbonate is an ester-substituted diarylcarbonate having the Formula (V):

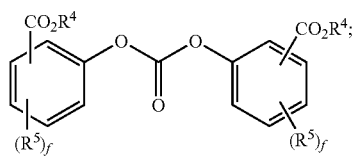

wherein $R^4$ is independently at each occurrence an aliphatic functionality having 1 to 20 carbons, a cycloaliphatic functionality having 4 to 20 carbons, or an aromatic functionality having 4 to 20 carbons, $R^5$ is independently at each occurrence a halogen atom, cyano group, nitro group, an aliphatic functionality having 1 to 20 carbons, a cycloaliphatic functionality having 4 to 20 carbons, or an aromatic functionality having 4 to 20 carbons and "f" is independently at each occurrence an integer having a value of 0 to 4. In one embodiment, at least one of the substituents —$CO_2R^4$ is attached in an ortho position of Formula (V).

Examples of specific ester-substituted diarylcarbonates include, but are not limited to, bis(methylsalicyl)carbonate (CAS Registry No. 82091-12-1) (also known as BMSC or bis(o-methoxycarbonylphenyl)carbonate), bis(ethylsalicyl)carbonate, bis(propylsalicyl)carbonate, bis(butylsalicyl)carbonate, bis(benzylsalicyl)carbonate, bis(methyl-4-chlorosalicyl)carbonate and the like. In one embodiment, bis(methylsalicyl)carbonate is used as the activated carbonate in melt polycarbonate synthesis due to its lower molecular weight and higher vapor pressure.

Some non-limiting examples of non-activating groups which, when present in an ortho position, would not be expected to result in activated carbonates are alkyl, cycloalkyl or cyano groups. Some specific and non-limiting examples of non-activated carbonates are bis(o-methylphenyl)carbonate, bis(p-cumylphenyl)carbonate, bis(p-(1,1,3,3-tetramethyl)butylphenyl)carbonate and bis(o-cyanophenyl)carbonate. Unsymmetrical combinations of these structures are also expected to result in non-activated carbonates.

Suitable solvents that can be employed include aliphatic alcohols having 1 to 4 carbon atoms, aliphatic ketones having 4 to 10 carbon atoms, chlorinated solvents having 1 to 6 carbon atoms, or aromatic solvents having 6 to 20 carbon atoms. Specific non-limiting examples of solvents include, methanol, isopropanol, butanol, n-propanol, n-pentanol, 2-methoxy propanol, ethanol, iso-butanol, tertiary butanol, tertiary pentanol, iso-pentanol, methylethyl ketone, methylisobutyl ketone, methylpropyl ketone, diethyl ketone, propylmethyl ketone, toluene, xylene, methyl salicylate, monochlorobenzene, dichlorobenzene, chloroform, carbon tetrachloride, dichloroethane, dichloromethane, and a combination of two or more of the foregoing.

In one embodiment, the amount of solvent used is about 10 grams to about 300 grams, based on 1 gram of the nanomaterial. Within this range the amount may be greater than or equal to 50 grams, or more specifically, greater than or equal to about 75 grams based on 1 gram of the nanomaterial. Also within this range the amount may be less than or equal to about 250 grams, or more specifically less than or equal to about 200 grams, based on 1 gram of the nanomaterial.

Catalysts that can be used in the polymerization reactions involving activated carbonates include for example, salts of alkaline earth metals, salts of alkali metals, quaternary ammonium compounds, quaternary phosphonium compounds, and mixtures thereof. It is often advantageous to use a combination of some amount of a salt of an alkaline earth metal and/or an alkali metal (i.e., an "alpha" catalyst) that does not degrade at temperatures used throughout the reaction together with a quaternary ammonium and/or a quaternary phosphonium compound that degrades at a temperature used in the reaction (i.e., a "beta" catalyst). Some non-limiting examples of alpha catalysts include sodium hydroxide, potassium hydroxide, sodium potassium hydrogen phosphate and lithium hydroxide. Some non-limiting examples of beta catalysts include tetramethylammonium hydroxide, tetrabutylammonium hydroxide, tetramethylphosphonium hydroxide, tetraphenylphosphonium hydroxide, tetraphenylphosphonium acetate, tetramethylphosphonium formate, tetrabutylphosphonium hydroxide, and tetrabutylphosphonium acetate. In one embodiment, the total amount of catalyst employed is about $1\times10^{-7}$ to about $1\times10^{-2}$ moles, more specifically about $1\times10^{-6}$ to about $1\times10^{-3}$ moles, or even more specifically about $1\times10^{-5}$ to about $1\times10^{-4}$ moles of catalyst based on the moles of the dihydroxy compound of Formula (I) employed. In one embodiment, the alpha catalyst used is sodium hydroxide. In one embodiment, the beta catalyst used is tetrabutylphosphonium acetate or tetramethylammonium hydroxide.

As described above, the method for preparing the polycarbonate nanocomposite comprises the step of forming a reactant mixture comprising nanomaterials, a solvent, a dihydroxy compound, and an activated carbonate, followed by polymerizing the reactant mixture in the presence of the solvent. The mixing can be carried out in various ways, as generally known to a person skilled in the art. The mixing can comprise a first step of preparing a nanomaterial dispersion in a solvent.

In one embodiment, an additional amount of a solvent can be added to a nanomaterial dispersion and the resultant mixture is then subjected to ultrasonic irradiation for a sufficient period of time to get an effective dispersion. The dihydroxy compound and the activated carbonate are then added to form the reactant mixture. The solvent added can be the same solvent as is present in the nanomaterial dispersion, such as for example, methylethyl ketone, or a different solvent selected from the list of suitable solvents discussed above.

In another embodiment, the nanomaterial dispersion can be added to the dihydroxy compound, where the dihydroxy compound can be in a solid form or in a molten form, followed by the addition of the activated carbonate to form the reactant mixture.

In another embodiment of preparing a polycarbonate nanocomposite, the nanomaterial dispersion can be added under stirring to a mixture comprising the solvent and a polycarbonate oligomer, such as for example, a hydroxy-terminated polycarbonate oligomer, to form a reactant mixture. Further, the polymerization of the oligomers may provide polycarbonate nanocomposites having better physical properties. The polycarbonate oligomer can also serve as a more advanced starting material for forming higher molecular weight polycarbonates. The polycarbonate oligomer can be prepared by general methods known in the art. One method of making a polycarbonate oligomer includes heating and stirring a mixture containing a dihydroxy compound, a solvent and an activated carbonate at a temperature of 150° C. to 220° C. for a period of about 2 minutes to about 4 hours. In one embodiment, the oligomers are formed without an activated carbonate, for example, with only the bisphenol A and diphenyl carbonate for several hours and then mixed with an activated carbonate, such as BMSC, after which the polymer is formed. In another embodiment, the oligomers are formed with by mixing bisphenol A with an activated carbonate such as BMSC for a short time (for example, 2 minutes to about 1 hour), and then they are further polymerized with the nanomaterials.

In another embodiment, the nanomaterial dispersion can be added to a homogeneous mixture of a solvent and a dihydroxy compound. The homogenous mixture is formed by heating and stirring the solvent and the dihydroxy compound at the melting temperature of the dihydroxy compound to form a reactant mixture. The reactant mixture formed is polymerized in the presence of a polymerization catalyst to provide a polycarbonate nanocomposite. One example of a suitable polymerization catalyst is a solution comprising tetramethylammonium hydroxide and sodium hydroxide.

Typically, the dispersion of the nanomaterials in the solvent is added to a solid or a molten mass of dihydroxy compound, followed by the addition of the polymerization catalyst and an activated carbonate, to form a reactant mixture. The polymerization reaction is carried out under an inert atmosphere, under pressure and at high temperatures. Initial pressure is higher, and as the reaction proceeds, the pressure is gradually reduced. Maintaining a low pressure during the polymerization process allows gradual removal of the solvent employed during the formation of the polycarbonate nanocomposite while at the same time ensuring the presence of at least some amount of the solvent until the end of the polymerization reaction. The reduced pressure also assists in the removal of the byproducts formed during the polymerization reaction.

In another embodiment, a polymer blend is prepared by blending a polymer with the polycarbonate nanocomposite prepared in accordance with the method described above. In one embodiment, the polymer blend can be prepared by mixing the polymer with the polycarbonate nanocomposite in an extruder to form the polymer blend. In another embodiment, the polymer blend can be prepared by adding the polymer to a reactant mixture comprising a dispersion of the nanomaterials in the solvent, a dihydroxy compound, a polymerization catalyst, and an activated carbonate, and extruding the mixture so formed to form a polymer blend. The conditions in the extruder are chosen so as to effect the formation of the polymer blend.

In one embodiment, the polymer is a thermoplastic polymer. Suitable non-limiting examples of the thermoplastic polymer include polystyrene, poly(methylmethacrylate), poly(vinyl chloride), acrylonitrile-butadiene-styrene copolymer (also commonly called as ABS), acrylonitrile-styrene-acrylate copolymer (also commonly called as ASA), styrene-acrylonitrile copolymer (also commonly called as SAN), polycarbonate, poly(phenyleneoxide), polyolefins, such as polypropylene and polyethylene, poly(acrylonitrile), polyamide, polyacetal, polyesters such as poly(ethyleneterephthalate) and poly(butyleneterephthalate), polyetherimides, such as ULTEM™ polyetherimide, and any mixture of the foregoing thermoplastic polymers. In one embodiment the thermoplastic polymer used is polycarbonate.

As mentioned above, the polycarbonate nanocomposite prepared by the methods disclosed herein comprises a polycarbonate and functionalized nanomaterials, wherein at least 60 weight percent of the nanomaterials added to the nanocomposite have an average inter-particle distance of about 0.05 nanometers to about 1500 nanometers, and wherein the amount of nanomaterials added is about 0.01 weight percent to about 10 weight percent based on the relative amount of the polycarbonate. These nanocomposites have superior performance properties, such as extension-modulus, elongation at break, hardness, transparency and flame retardant properties.

The polycarbonate nanocomposites prepared using the process described herein can be used in various polymer compositions. The compositions may further optionally include various additives ordinarily incorporated in resin compositions of this type, with the proviso that the additives do not adversely affect the desired properties of the composition. Such additives may include antioxidants, heat stabilizers, flame retardants, UV stabilizers, anti-static agents, mold releasing agents, and the like, and combinations comprising the foregoing. For example, the polymer composition can comprise a heat stabilizer from about 0.01 weight percent to about 1 weight percent; an antistatic agent from about 0.01 weight percent to about 1 weight percent; and/or a mold releasing agent from about 0.1 weight percent to about 1 weight percent, each based upon the total weight of the polymer.

The polymer compositions may be used for any application in which the physical and chemical properties of the polycarbonate nanocomposite are desired. In certain embodiments, the polymer compositions may be used in applications including packaging material (and especially drug and cosmetic packaging), automotive parts, telecommunication accessories (for example, cell phone covers), computers and consumer electronics, construction materials, medical devices, eyewear products, secure documents including passports and ID cards, credit cards, films and sheets (including those used in display applications), and the like.

A further understanding of the techniques described above can be obtained by reference to certain specific examples that are provided herein for purposes of illustration only and are not intended to be limiting.

EXAMPLES

Haze was measured in accordance with ASTM B 1003 test method by using a BYK Gardner hazemeter. A 2 millimeter thick sample was used for the measurement.

Hardness was measured using a micro-indentation technique. A Vickers indenter was used to make an indent on a 30 millimeters (mm)×30 mm square and 1.8 mm thick molded plaque of the polycarbonate nanocomposite. The indenter employed in the Vickers test was a square-based pyramid whose opposite sides meet at the apex at an angle of 136°. The indenter tip is pressed into the surface of the material at loads of 0 N to a maximum of 50 N at an indent speed of 50 to 100 microns per minute. The resultant indentation was about 100 micrometer deep and had an area of about 1 square millimeter. The hardness value (HV) is calculated using the following formula:

$$HV = 1.854(F/D^2),$$

with F being the applied load (measured in Newtons) and $D^2$ the area of the indentation (measured in square millimeter).

SAXS spectra were acquired by a Hecus-Mbraun system (coupled with a Kratky camera) using a Cu—Kα radiation source (wavelength=0.1542 nm) from a Phillips PW 1830 X-ray generator. A position sensitive detector (PSD 50M manufactured by Hecus Mbraun) collected the data. The detector had a scattering angular range of 0.1 to 7.0° 2θ, a resolution of 54 μm, a window length of 50 mm (1024 channels in total) and zero background noise of less than $10^{-5}$ cps/channel. In the position sensitive X-ray detector the internal pressurized gas (~6 to 8 bar) is used to generate an avalanche of ionized atoms upon entry of X-rays. The counter gas is an argon/methane (90/10 vol %) mixture with argon the medium to be ionized and methane serving as a quencher. Attenuation was set so counts on the detector did not exceed 100 counts/second. The data was processed using IGOR Pro version 5.0.5.7 software supplied by Wavemetrics. The liquid samples of functionalized and unfunctionalized nanosilica in solvent, as received from the supplier, were measured in quartz cuvettes of 1 mm ID. The molded solid samples of the polycarbonate compositions were of such thickness as to transmit about 1/e (1/2.71828 or 0.368) of a Cu—Kα X-ray beam and were measured in transmission without further preparation. Dimensions of the solid samples was 10 mm (width)×2 mm (thickness)×30 mm (length). Data was acquired while the X-ray beam passed through the thickness of the sample along the surface normal for 3600 s. The sample cross sectional area measured was 2.6 cm×0.1 mm. The data was corrected for blank scattering (Air Scattering and Scattering from Blank Cuvette), and desmeared according to the method described in J. A. Lake, Acta Crystallographica 23, 191 (1967)). The scattered intensity was fitted to a Unified Model to obtain the Radius of Gyration and Surface to Volume ratio (Beaucage, G. (1996). J. Appl. Cryst. 29, 134-146). This was then fitted using a Maximum Entropy Method Algorithm (MEM) (Potton, J. A., et al. (1988). J. Appl. Cryst. 21, 663-668 and 891-897) to calculate the particle size distribution. This allows comparison of the particle size distribution of the nanosilica in the solvent and in the polycarbonate matrix. R-Squared was from 0.9871 to 0.9994. The results are shown in Table 4.

Extension-modulus (E-modulus) was determined by first measuring tensile parameters at ambient temperature according to ISO 527 test method using an Instron™ model 5566 instrument equipped with a digital data acquisition system, and then using an extensiometer. The data obtained from six specimens was averaged to determine the mechanical properties with error limits of the order of 5 percent for the E-modulus and 20 percent for the elongation at break.

Samples for Transmission Electron Microscopy were obtained from the polycarbonate nanocomposite strands that were taken either from the reactor tube or Haake extruder. Sections of the strands were collected on copper grids and examined at an accelerating voltage of 120 kilovolts using a SEI Tecnai GII Transmission Electron Microscope to provide Transmission Electron Micrographs.

The following general procedure was used for preparing a dispersion of functionalized nanosilica particles. In a round bottom flask, a mixture of 20 milliliters (ml) of a commercially available dispersion of nanosilica particles dispersed in solvent, 20 ml of solvent and 0.5 ml of functionalizing agent (as listed in Tables 1 and 2) was heated to 80° C. and stirred for 1 hour. Then 0.05 ml of trimethyl amine catalyst was added and the resultant mixture was allowed to react under constant stirring at 80° C. for about 1 to 2 hours. The final mixture contained 15 percent by weight of functionalized nanosilica particles, based on the volume of solvent. For example, for Sample A, the nanosilica was Snowtex Organosilicasol™ MEK-ST, 30% by weight $SiO_2$ in methyl ethyl ketone supplied by Nissan Chemical, the solvent was methyl salicylate, and the functionalizing agent was phenyltrimethoxy silane.

Samples A through D were prepared according to the general procedure described above using the materials in Table 1 and 2. In the event that more than one functionalization agent is used, it is desirable that the subsequent functionalization agents are added to the dispersion after completion of the previous reaction and then allowed to react for an additional 1 to 2 hours. Sample D used the commercially available Snowtex Organosilicasol™ MEK-ST without treatment.

Sample E through H, wherein the starting material consists of nanomaterials in powder form, were prepared by dispersing them in solvent and placing them in an ultrasonic bath for about 10 minutes to about 2 hours to create a homogeneous particle dispersion. The concentration is not critical and depends on the type of particles, the solvent used and the surface characteristics of the particles. Typical concentrations are between 0.5 and 20% (wt/vol). Prior to using the nanoparticle dispersion in the polymerization, the dispersion may be diluted further with the same or a different solvent until a dispersion concentration of 0.1 to 20% wt/vol is achieved. An additional ultrasound treatment may be used.

Example 5 provides a general method for preparing a polycarbonate nanocomposite by in-situ polymerization of a dihydroxy compound (bisphenol A) and an activated carbonate (bis(methylsalicyl)carbonate (BMSC)) in the presence of methyl salicylate as the solvent and nanoparticles (the functionalized nanosilica of Sample A). See Table 2 for an overview of the materials used. In a round bottom flask, 1.5 ml of the functionalized nanosilica dispersion of Sample A was diluted with 20 ml of methyl salicylate. The diluted dispersion was then placed in an ultrasound bath (Transonic T 890/H sonicator) for about 30 minutes at a power of 470 Watts. The dispersion was transferred to a glass tube reactor containing bisphenol A (24 g) and BMSC (35.73 g) and mixed to obtain a homogeneous dispersion. 400 microliters of an aqueous catalyst solution containing tetramethylammonium hydroxide (2.6 milligrams (mg)) and sodium hydroxide (9.58 mg) were added, and the reactor was purged with nitrogen to remove oxygen. The mixture was heated to a temperature of 180° C. under stirring at a speed of 90 rotations per minute (rpm). After 15 minutes the pressure in the tube reactor reached 910 millibar (mbar). The temperature was increased to 220° C., and the pressure was slowly reduced from 910 mbar to 100 mbar over a period of 4 to 5 minutes at a rate of 75 to 100 mbar per 30 seconds. After holding at 100 mbar and 220° C. for 10 minutes, the temperature was increased to 280° C. The reaction mixture was then maintained at 280° C. and 100 mbar for 15 minutes to provide a bisphenol A polycarbonate nanocomposite.

Examples 6 to 16 and Comparative Example 1 (CE-1) were prepared using the method for Example 5 except different starting materials were used, as listed in Tables 2 and 3. Comparative Examples 6 to 8 (CE-6 to CE-8) were prepared using the method for Example 5 except that diphenyl carbonate was used instead of an activated carbonate (such as BMSC). Comparative Example 9 (CE-9) was prepared using the method for Example 5, except that Cloisite® 10A nanoclay powder was added instead of silica. The materials used and the results obtained are listed in Tables 2 and 3.

Example 17 provides a general process for the preparation of a polycarbonate nanocomposite by in situ polymerization of a dihydroxy compound (e.g. bisphenol A), an activated carbonate (e.g. BMSC), nanomaterials (e.g. nanoclay) in the presence of a solvent (methyl salicylate) in an extruder. 100 ml of the nanoclay dispersion of Sample H was added to a reactor containing bisphenol A (300 g) and BMSC (446.7 g) to form a mixture. The mixture was mixed with bisphenol A homopolycarbonate (300 g) to form an extruder feed. The extruder feed was passed through a ZSK-25 twin-screw extruder having a screw diameter of 25 mm and length of 600 mm, using a barrel temperature of 260° C., a screw speed of 300 rotations per minute, and a feed rate of 10 kilograms/hour to provide the polycarbonate nanocomposite. In one embodiment, the reaction mixture is allowed to react to form oligomeric polycarbonate that is fed to the extruder. In another embodiment the reaction mixture is directly fed to the extruder.

Comparative Example 2 (CE-2) provides a process for preparing a polycarbonate nanocomposite by forming a bisphenol A homopolycarbonate in the absence of a solvent. BMSC was the activated carbonate and the nanosilica dispersion of Sample A was used as the nanomaterial. The method of Example 5 was followed except that no additional solvent was added to the dispersion. The reaction mixture was prepared as described above, but after the addition of catalyst and inertization of the reactor, the mixture was heated to 80° C. The pressure in the reactor was slowly reduced to about 250 mbar and maintained for about 30 minutes. This effectively removed the solvent. Hereafter the reaction was completed as described in Example 5.

Comparative Example 3 (CE-3) provides a method for making a polycarbonate nanocomposite by melt-blending commercially available nanosilica (Sample D), with bisphenol A homopolycarbonate having an approximate weight average molecular weight of 40000 Daltons (as determined using polystyrene standards). An appropriate amount of the commercially available nanosilica was combined with the bisphenol A homopolycarbonate in a high-speed mixer to form a mixture having 1 weight percent of the nanosilica relative to the weight of the homopolycarbonate. This mixture was then passed through a ZSK-25 twin-screw extruder having a screw diameter of 25 mm and length of 600 mm, using a barrel temperature of 280° C., a screw speed of 400 rotations per minute, a feed rate of 10 kilograms/hour, and a residence time of 30 seconds to provide the polycarbonate nanocomposite.

Comparative Examples 4, 5 and 10 (CE-4, CE-5 and CE-10) were prepared using the method of Samples E through H except that nanotalc, nanoalumina and nanoclay respectively were used instead of nanosilica.

TABLE 1

| Nanoparticle Sample | Tradename (if applicable) | Material type | Treatment |
|---|---|---|---|
| Sample A | Snowtex Organosilicasol MEK ST | silica | phenyl trimethoxy silane |
| Sample B | Snowtex Organosilicasol MEK ST | silica | PEG trimethoxy silane |
| Sample C | Snowtex Organosilicasol MEK ST | silica | phenyl trimethoxy silane/PEG trimethoxy silane |
| Sample D | Snowtex Organosilicasol MEK ST | silica | none |
| Sample E | Cloisite 10A | clay | none |
| Sample F | Nanotalc Nanova | talc | none |
| Sample G | nanoalumina | alumina | none |
| Sample H | Cloisite 30B | clay | none |

TABLE 2

| | Experiment | | | | | | | | | | | | |
|---|---|---|---|---|---|---|---|---|---|---|---|---|---|
| | Ex 5 | Ex 6 | Ex 7 | Ex 8 | Ex 9 | Ex 10 | Ex 11 | Ex 12 | Ex 13 | Ex 14 | Ex 15 | Ex 16 | Ex 17 |
| Nanoparticle sample | A | B | C | A | E | F | G | A | C | B | H | H | H |
| amount (wt % in composition) | 1 | 1 | 1 | 1 | 1 | 3 | 5 | 5 | 1 | 1 | 3 | 3 | 3 |
| solvent/particle ratio | 100/1.05 | 100/1.05 | 100/1.05 | 100/1.29 | 100/5 | 100/3.75 | 100/6.25 | 100/6 | 100/2.8 | 100/0.85 | 100/10 | 100/10 | 100/10 |
| Nanoparticle form | Disp | Disp | Disp | Disp | Disp | Disp | Disp | Disp | Disp | Disp | Disp | Disp | Disp |
| dihydroxy compound | BPA | BPA | BPA | BPA | BPA | BPA | BPA | Isosorbide | DMBPC/BPA | DMBPC/BPA | BPA | BPA-oligomer | BPA |
| Carbonate | BMSC | BMSC | BMSC | BMSC | BMSC | BMSC | BMSC | BMSC | BMSC | BMSC | BMSC | BMSC | BMSC |
| Solvent type | MS | MS | MS | MeOH | toluene | MS | MS | MS | MS | MS | MS | MS | MS |
| Polymerization method | Batch | Batch | Batch | Batch | Batch | Batch | Batch | Batch | Batch | Batch | Batch | Batch | Extruder |

TABLE 2-continued

| | Ex 5 | Ex 6 | Ex 7 | Ex 8 | Ex 9 | Ex 10 | Ex 11 | Ex 12 | Ex 13 | Ex 14 | Ex 15 | Ex 16 | Ex 17 |
|---|---|---|---|---|---|---|---|---|---|---|---|---|---|
| Results | | | | | | | | | | | | | |
| Hardness (MPa) | 192 | 188 | 196 | 192 | 200 | 184 | 185 | 290 | 225 | 225 | 211 | 215 | 213 |
| E-modulus (GPa) | 2.6 | 2.5 | 2.7 | 2.6 | 2.6 | 2.5 | 2.4 | 3.7 | 2.7 | 2.7 | NA | NA | 3.15 |
| Visual appearance | slightly hazy | Hazy | slightly hazy | slightly hazy | NT | NT | NT | clear | Hazy | Hazy | NT | NT | Hazy |
| Haze (%) | 10 | 20-50 | 5 | >50 | NT | NT | NT | 3 | 20-50 | 20-50 | NT | NT | NT |

*NT - not tested due to very small amount of material available
BPA - Bisphenol A;
BMSC - bis(methylsalicyl)carbonate;
MS - methyl salicylate;
DMBPC/BPA - 1,1-bis(4-hydroxy-3-methylphenyl)cyclohexane/bisphenol A;
MeOH - methanol;
Disp - Dispersion

TABLE 3

| | CE-1 | CE-2 | CE-3 | CE-4 | CE-5 | CE-6 | CE-7 | CE-8 | CE-9 | CE-10 |
|---|---|---|---|---|---|---|---|---|---|---|
| Nanoparticles sample | D | A | D | F | G | A | A | A | E | H |
| amount (wt % in composition) | 1 | 1 | 1 | 3 | 5 | 1 | 1 | 1 | 2.5 | 2.4 |
| solvent/particle ratio | 100/1.08 | 100/1.05 | 100/30 | 0 | 0 | 100/0.9 | 100/0.9 | 0 | 0 | 0 |
| Nanoparticle form | Disp | Disp | powder | powder | powder | Disp | Disp | powder | powder | powder |
| dihydroxy compound | BPA | BPA | PC | PC | PC | BPA | BPA | BPA | BPA | PC |
| Carbonate | BMSC | BMSC | — | — | — | DPC | DPC | DPC | BMSC | — |
| Solvent type | MS | Methanol | — | — | — | MS | toluene | — | — | — |
| Polymerization method | Batch | Batch | Extruder | Extruder | Extruder | Batch | Batch | Batch | Batch | Extruder |
| Results | | | | | | | | | | |
| Hardness (MPa) | 181 | 176 | 175 | 181 | 175 | NT* | NT* | NT* | 185 | brittle, NT |
| E-modulus (GPa) | 2.4 | 2.3 | 2.3 | 2.3 | 2.3 | NT* | NT* | NT* | 2.4 | 2.7 |
| Visual appearance | Hazy | Very Hazy | Very hazy | Very hazy | Very hazy | NT* | NT* | NT* | Very hazy | NT |
| Haze (%) | NT | >50 | 90 | >50 | >50 | NT* | NT* | NT* | NT | NT |

NT* - Very low molecular weight, could not be tested
BMSC - bis(methylsalicyl) carbonate:
DPC - diphenyl carbonate

TABLE 4

| | Sample A | Sample D | Ex 5 | Ex 6 | Ex 7 | Ex 8 | Ex 12 | Ex 13 | Ex 14 | CE-1 | CE-2 | CE-3 |
|---|---|---|---|---|---|---|---|---|---|---|---|---|
| Particle Size Dist. | | | | | | | | | | | | |
| ≤30 nm | 100 | 100 | 99.6 | 85.8 | 5 | 99 | 38.9 | 0 | 65.2 | 53.3 | 0.6 | 71.3 |
| 30-70 nm | 0 | 0 | 0.4 | 11.3 | 91.1 | 0.9 | 61.1 | 96.6 | 32.6 | 21.8 | 56 | 12.8 |
| 50-70 nm | 0 | 0 | 0.1 | 2.8 | 3.8 | 0.1 | 0 | 0.2 | 2.2 | 24.9 | 43.2 | 15.7 |
| >70 nm | 0 | 0 | 0 | 0.1 | 0.1 | 0.1 | 0 | 3.2 | 0 | 0 | 0.2 | 0.2 |
| Calculated Ranges | | | | | | | | | | | | |
| ≤50 nm | 100 | 100 | 99.9 | 97.1 | 96.1 | 99.9 | 100 | 96.6 | 97.8 | 75.1 | 56.6 | 84.1 |
| >50 nm | 0 | 0 | 0.1 | 2.9 | 3.9 | 0.1 | 0 | 3.4 | 2.2 | 24.9 | 43.4 | 15.9 |
| Hardness (MPa) | NA | NA | 192 | 188 | 196 | 192 | 290 | 225 | 225 | 181 | 176 | 175 |
| E-modulus (GPa) | NA | NA | 2.6 | 2.5 | 2.7 | 2.6 | 3.7 | 2.7 | 2.7 | 2.4 | 2.3 | 2.3 |

Tables 2 and 3 show the results of the Examples and Comparative Examples respectively. Comparing Examples 5 through 9 with Comparative Examples 1 to 3 shows that polycarbonate nanocompositions made according to the method of the invention show higher E-modulus (in the range of 2.5 to 2.7 versus 2.3 to 2.4 respectively) and hardness (188 to 200 versus 175 to 181 respectively) than those prepared using other methods. Comparative Examples 6 to 8 demonstrate that the use of an activated carbonate improves the physical properties. As shown in the Tables, the Examples using an activated carbonate have much better results than Comparative Examples 6 to 8, which do not use an activated carbonate. Examples 12 through 14 and Example 16 show that different dihydroxy compounds or oligomers may be successfully employed in the method of the invention.

Table 4 shows the particle size distributions as measured by SAXS for a number of the examples as well as the starting materials. The starting materials all show excellent dispersion with 100% of the particles having a particle size of less than 30 nm. The calculated ranges contain the sums of the numbers in the first 2 columns (less than 30 nm and 30 to 50 nm) and the sums of the numbers in columns 3 and 4 (50 to 70 nm and >70 nm). The results show clearly that when greater than 90%, preferably greater than 95% of the particles have a diameter less than 50 nm, improved hardness and E-modulus are obtained.

FIG. 1 represents a TEM measured on a 200 nm scale for the polycarbonate nanocomposite prepared in Example 7. FIG. 1 shows that the nanomaterial is dispersed throughout the entire sample.

FIG. 2 represents a TEM measured on a 200 nm scale for the polycarbonate nanocomposite prepared in CE-1. FIG. 2 shows that the nanomaterial is dispersed throughout the entire sample with some portion showing aggregates.

FIG. 3 represents a TEM measured on a 200 nm scale for the polycarbonate nanocomposite prepared in CE-3. FIG. 3 shows that a portion of the nanomaterials form dense agglomerates of about 400 nm in size in the sample.

FIG. 4 represents a SAXS plot of particle size distribution showing two distributions at about 40 nanometers and 150 nanometers. Note that the vertical scale (intensity) is logarithmic and that the second peak is therefore of very low intensity relative to the first peak.

FIG. 5 represents a TEM measured on a 100 nm scale for the polycarbonate nanocomposite prepared in Example 13. FIG. 5 shows that the nanomaterial is dispersed throughout the entire sample.

While typical embodiments have been set forth for the purpose of illustration, the foregoing descriptions should not be deemed to be a limitation on the scope herein. Accordingly, various modifications, adaptations, and alternatives may occur to one skilled in the art without departing from the spirit and scope herein.

The invention claimed is:

1. A method of preparing a polycarbonate nanocomposite, comprising:
    forming a reactant mixture comprising a nanomaterial, a solvent, a dihydroxy compound and an activated carbonate, wherein the amount of solvent in the reactant mixture before commencing the reaction is from 10-300 grams of solvent per gram of the nanomaterial in the reactant mixture; followed by
    commencing a reaction of the dihydroxy compound and the activated carbonate in the presence of the solvent, the nanomaterial, and a polymerization catalyst to form the polycarbonate nanocomposite;
    wherein 0.1 to 10 percent by weight of the total polycarbonate nanocomposite is the nanomaterial,
    wherein the nanomaterial is functionalized or partly functionalized,
    wherein greater than 90% by volume of the particles of the nanomaterial in the composition have a particle diameter less than 50 nm as measured by SAXS.

2. The method of claim 1, wherein greater than 95% by volume of the particles have a particle diameter less than 50 nm as measured by SAXS.

3. The method of claim 1, wherein the nanomaterial comprises nanosilica, nanoclay, nanotalc, nanoalumina, or a combination of two or more of the foregoing nanomaterials.

4. The method of claim 3, wherein the nanomaterial comprises nanosilica.

5. The method of claim 1, wherein the polycarbonate nanocomposite comprises 0.5 to 5 percent by weight of the total composition of nanomaterial.

6. The method of claim 1, wherein the polycarbonate nanocomposite comprises 0.7 to 3 percent by weight of the total composition of nanomaterial.

7. The method of claim 1, wherein the nanomaterial comprises nanosilica.

8. The method of claim 1, wherein the polycarbonate nanocomposite comprises 0.5 to 5 percent by weight of a nanomaterial comprising nanosilica, nanoclay, nanotalc or nanoalumina, or a combination of two or more of nanomaterials, wherein the nanomaterial is functionalized or partly functionalized.

9. The method of claim 8, wherein the nanomaterial comprises nanosilica.

10. The method of claim 8, wherein the composition comprises 0.7 to 3 percent by weight of the total composition of nanomaterial.

11. The method of claim 1, further comprising injection molding or extruding the polycarbonate nanocomposite to form an article.

12. The method of claim 1, wherein the activated carbonate has the formula (III):

wherein Ar is a substituted aromatic functionality having 6 to 30 carbon atoms.

13. The method of claim 1, wherein the activated carbonate has the formula (V):

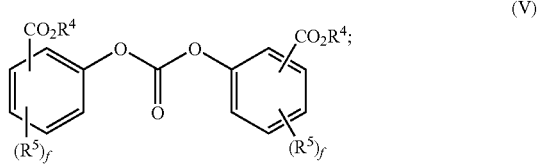

wherein $R^4$ is independently at each occurrence an aliphatic functionality having 1 to 20 carbons, a cycloaliphatic functionality having 4 to 20 carbons, or an aromatic functionality having 4 to 20 carbons, $R^5$ is independently at each occurrence a halogen atom, cyano group, nitro group, an aliphatic functionality having 1 to 20 carbons, a cycloaliphatic functionality having 4 to 20 carbons, or an aromatic functionality having 4 to 20 carbons and "f" is independently at each occurrence an integer having a value of 0 to 4.

14. The method of claim 1, wherein the activated carbonate is selected from the group consisting of bis(methylsalicyl)carbonate, bis(ethylsalicyl)carbonate, bis(propylsalicyl)carbonate, bis(butylsalicyl)carbonate, bis(benzylsalicyl)carbonate, bis(methyl-4-chlorosalicyl)carbonate, and combinations thereof.

15. The method of claim 1, wherein the activated carbonate comprises bis(methylsalicyl)carbonate.

16. The method of claim 1, comprising adding additional solvent to a dispersion of the nanomaterial, then subjecting the dispersion and solvent to ultrasonic irradiation, followed by adding the dihydroxy compound and the activated carbonate to form the reactant mixture.

17. The method of claim 1, comprising adding a dispersion of the nanomaterial to the dihydroxy compound followed by adding the activated carbonate to form the reactant mixture.

18. The method of claim 1, comprising adding a dispersion of the nanomaterial under stirring to a mixture comprising solvent and a hydroxy-terminated polycarbonate oligomer followed by adding the activated carbonate to form the reactant mixture.

19. The method of claim 1, comprising adding a dispersion of the nanomaterial to a homogeneous mixture of the solvent and the dihydroxy compound.

20. The method of claim 1, wherein the amount of solvent in the reactant mixture before commencing the reaction is at least 50 grams of solvent per gram of the nanomaterial in the reactant mixture.

21. The method of claim 1, wherein the amount of solvent in the reactant mixture before commencing the reaction is at least 75 grams of solvent per gram of the nanomaterial in the reactant mixture.

* * * * *